United States Patent
Chen et al.

(10) Patent No.: US 7,414,560 B2
(45) Date of Patent: Aug. 19, 2008

(54) WIRELESS COMMUNICATION SYSTEM INCLUDING AN AUDIO UNDERFLOW PROTECTION MECHANISM OPERATIVE WITH TIME DOMAIN ISOLATION

(76) Inventors: Shaojie Chen, 11617 Georgian Oaks Dr., Austin, TX (US) 78739; Wasim Quddus, 4305 Hoffman Dr., Austin, TX (US) 78749; David O. Anderton, 11021 Ariock La., Austin, TX (US) 78739

( * ) Notice: Subject to any disclaimer, the term of this patent is extended or adjusted under 35 U.S.C. 154(b) by 0 days.

(21) Appl. No.: 11/744,801

(22) Filed: May 4, 2007

(65) Prior Publication Data
US 2007/0290910 A1   Dec. 20, 2007

Related U.S. Application Data

(63) Continuation-in-part of application No. 11/172,213, filed on Jun. 29, 2005, now Pat. No. 7,227,484.

(51) Int. Cl.
*H03M 1/66* (2006.01)
(52) U.S. Cl. .................. 341/144; 341/172; 375/232; 375/350; 375/372; 340/539.12
(58) Field of Classification Search .......... 341/144, 341/172; 375/232, 350, 372; 340/539.12; 358/296; 370/241.1
See application file for complete search history.

(56) References Cited

U.S. PATENT DOCUMENTS

| | | | |
|---|---|---|---|
| 4,384,361 A | 5/1983 | Masaki | |
| 4,805,165 A | 2/1989 | Kawamura | |
| 4,870,699 A | 9/1989 | Garner | |
| 4,879,758 A | 11/1989 | DeLuca | |
| 4,930,126 A | 5/1990 | Kazecki | |
| 4,996,639 A | 2/1991 | Ishimoto | |
| 5,031,233 A | 7/1991 | Ragan | |
| 5,058,203 A | 10/1991 | Inagami | |
| 5,142,699 A | 8/1992 | Sato | |
| 5,150,361 A | 9/1992 | Wieczorek | |
| 5,151,769 A | 9/1992 | Immorlica, Jr. | |
| 5,241,541 A | 8/1993 | Farrell | |
| 5,280,644 A | 1/1994 | Vannatta | |
| 5,307,066 A | 4/1994 | Kobayashi | |

(Continued)

FOREIGN PATENT DOCUMENTS

EP   0447302 B1   9/1991

(Continued)

OTHER PUBLICATIONS

Zhang "A Direct-Conversion Transceiver for IEEE 802.11a/b/g WLANS", IEEE CICC (Oct. 5, 2004).

(Continued)

*Primary Examiner*—Jean B Jeanglaude

(57) ABSTRACT

A wireless communication device reduces undesired audio underflow in a digital to analog receive path that employs time domain isolation. One or more buffers in the receive path receive processed audio samples from a signal processor. A control circuit senses when the buffers in the receive path are substantially empty. In response to a substantially empty determination by the control circuit, the control circuit instructs one of the buffers to repeat the last processed audio sample which that buffer received to reduce or avoid audio underflow.

30 Claims, 7 Drawing Sheets

U.S. PATENT DOCUMENTS

| | | | |
|---|---|---|---|
| 5,355,524 A | 10/1994 | Higgins | |
| 5,471,471 A | 11/1995 | Freeburg | |
| 5,471,663 A | 11/1995 | Davis | |
| 5,475,684 A | 12/1995 | Shimizu | |
| 5,519,711 A | 5/1996 | Sointula | |
| 5,604,928 A | 2/1997 | Hamano | |
| 5,621,766 A | 4/1997 | Bakke | |
| 5,630,224 A | 5/1997 | Swail | |
| 5,649,160 A | 7/1997 | Corry | |
| 5,748,680 A | 5/1998 | Mobin | |
| 5,758,278 A | 5/1998 | Lansdowne | |
| 5,764,693 A | 6/1998 | Taylor | |
| 5,812,936 A | 9/1998 | DeMont | |
| 5,838,741 A | 11/1998 | Callaway, Jr. | |
| 5,842,037 A | 11/1998 | Haartsen | |
| 5,872,540 A | 2/1999 | Casabona | |
| 5,875,449 A | 2/1999 | Ono | |
| 5,917,854 A | 6/1999 | Taylor | |
| 5,920,592 A | 7/1999 | Tanaka | |
| 5,923,761 A | 7/1999 | Lodenius | |
| 5,448,755 A | 9/1999 | Tanaka | |
| 5,953,640 A | 9/1999 | Meador | |
| 6,005,857 A | 12/1999 | Honkasalo | |
| 6,020,614 A | 2/2000 | Worley | |
| 6,243,597 B1 | 6/2001 | Dannen | |
| 6,246,335 B1 | 6/2001 | Tsunoda | |
| 6,292,654 B1 * | 9/2001 | Hessel et al. | 455/223 |
| 6,327,469 B1 | 12/2001 | Gastra | |
| 6,349,196 B1 | 2/2002 | Bourzeix | |
| 6,366,622 B1 | 4/2002 | Brown | |
| 6,381,265 B1 * | 4/2002 | Hessel et al. | 375/219 |
| 6,393,071 B1 | 5/2002 | Bourzeix | |
| 6,480,533 B1 | 11/2002 | Chu | |
| 6,480,555 B1 | 11/2002 | Renard | |
| 6,490,262 B1 | 12/2002 | Hogger | |
| 6,498,819 B1 | 12/2002 | Martin | |
| 6,510,185 B2 | 1/2003 | Lee | |
| 7,209,061 B2 | 10/2006 | Somayajula | |
| 2002/0080728 A1 | 6/2002 | Sugar | |
| 2003/0020521 A1 | 1/2003 | Lee | |
| 2005/0228913 A1 | 10/2005 | Matthews | |
| 2006/0253634 A1 | 11/2006 | Matthews | |
| 2007/0001884 A1 | 1/2007 | Anderton | |

FOREIGN PATENT DOCUMENTS

| | | |
|---|---|---|
| EP | 0511511 A2 | 11/1992 |
| EP | 0511511 A3 | 11/1992 |
| EP | 0511511 B1 | 11/1992 |
| EP | 0463621 B1 | 1/2000 |

OTHER PUBLICATIONS

U.S. Appl. No. 10/426,042 filed Apr. 29, 2003, by Navdeep Sooch and G. Tyson Tuttle, entitled "Highly Integrated Radio -Frequency Apparatus and Associated Methods".

* cited by examiner

WIRELESS COMMUNICATION SYSTEM INCLUDING AN AUDIO UNDERFLOW PROTECTION MECHANISM OPERATIVE WITH TIME DOMAIN ISOLATION

CROSS REFERENCE TO RELATED PATENT APPLICATIONS

This patent application is a continuation-in-part of, and claims priority to, the U.S. Patent Application entitled "Startup Apparatus and Technique For A Wireless System That Uses Time Domain Isolation" by inventors Anderton, et al., Pub. No. US 2007/0001884 A1, Ser. No. 11/172,213, filed Jun. 29, 2005, now U.S. Pat. No. 7,227,484, and which is incorporated herein by reference in its entirety.

TECHNICAL FIELD OF THE INVENTION

The disclosures herein relate generally to wireless communication devices, and more particularly, to reducing audio underflow in the receive path of a wireless communication device.

BACKGROUND

Modern wireless communication devices typically include a baseband section, an RF transmitter section and an RF receiver section. In broad terms, when the wireless device operates in transmit mode, the baseband section processes signals before they are modulated and up-converted for transmission by the RF transmitter section at a higher frequency than employed in the baseband section. When the wireless device operates in receive mode, the baseband section processes signals after they have been down-converted by the RF receiver section. The transmitter section and receiver section together form an RF transceiver section. The baseband section and the RF transceiver section may be fabricated on the same integrated circuit (IC) or alternatively on separate integrated circuits that are interfaced with one another. The RF transceiver section includes a frequency synthesizer that controls the transmit and receive frequencies of the communication device.

Both the RF transmitter section and the RF receiver section may employ a digital signal processor (DSP) to facilitate a number of signal processing tasks. For example, the transmitter section may employ the DSP to perform voice encoding, channel encoding and frequency burst generation tasks. The receiver section may employ the DSP to perform equalization, channel decoding and voice decoding tasks. As miniaturization continues forward, the components of a wireless communication device come closer and closer together. Unfortunately, with such advances in miniaturization, it is possible that noise generated by the digital activities of the DSP may couple to the receiver section of the device and hinder RF signal reception.

Time domain isolation provides a way to effectively silence noisy digital circuits such as the DSP during time periods when the receiver section is active. In broad terms, time domain isolation provides that noisy components such as the DSP are disabled at times when the RF receiver section is conducting noise sensitive signal receiving activities. In this approach, time is divided into alternating RF time slots and signal processing time slots. The RF receiver section is enabled during RF time slots and disabled during signal processing time slots when the DSP is active. The DSP is enabled or active during the signal processing time slots and disabled or inactive during the RF time slots when the RF receiver section is active.

In one time domain isolation implementation, an audio codec in a digital to analog conversion (DAC) path receives signal samples from the DSP and coverts them into an analog audio output signal. The DAC path includes one or more buffers that store received samples that were received when the RF receiver section was enabled. These buffers are used to help prevent audio underflow when the RF receiver section is disabled and the DSP is enabled. Audio underflow occurs when insufficient data is received from the DSP by the audio codec that converts the received samples or data to an analog audio output signal. If audio underflow occurs, it may be heard as an annoying gap or pop in the audio output signal of the audio codec. While buffers are helpful in reducing audio underflow in wireless communication devices using time domain isolation, audio underflow may still occur under some circumstances.

What is needed is a wireless communication device that further reduces the likelihood of audio underflow in the wireless communication device.

SUMMARY

Accordingly, in one embodiment, a method is disclosed for reducing audio underflow in a wireless communication device. The method includes providing a first buffer that receives information from a processor of the wireless communication device. The processor is enabled for signal processing time slots and is disabled for RF time slots under time domain isolation. The method also includes supplying, by the first buffer, received information to a filter that provides an analog audio output signal, the received information including audio data samples. The method further includes determining, by a control circuit, when the first buffer stores less than a predetermined amount of audio data samples that define the first buffer as being substantially empty. In response to a substantially empty buffer determination, the control circuit instructs the first buffer to repeatedly send a last audio data sample received by the first buffer to the filter such that audio underflow at the filter is reduced.

In another embodiment, a wireless communication device is disclosed that includes a radio frequency (RF) section that receives RF signals, thus providing received signals. The RF section is switchable to an enabled state during RF time slots and to a disabled state during signal processing time slots under time domain isolation. The wireless communication device also includes a processor, coupled to the RF section, that processes received signals from the RF section, the processor being switchable to an enabled state during signal processing time slots and to a disabled state during RF time slots under time domain isolation. The processor provides processed audio data samples. The wireless communication device further includes a digital to analog conversion (DAC) path, coupled to the processor, that converts processed audio data samples to an analog audio output signal. The DAC path includes a first buffer that receives the processed audio data samples from the processor. The DAC path also includes a filter, coupled to the first buffer, that receives processed audio data samples from the first buffer and that produces the analog audio output signal therefrom. The DAC path further includes a control circuit, coupled to the first buffer, that determines when the first buffer is storing less than a predetermined amount of processed audio data samples that define the first buffer as being substantially empty. In response to a substantially empty first buffer determination, the control circuit instructs the first buffer to repeatedly send a last processed audio data sample received by the first buffer to the filter such that audio underflow at the filter is reduced.

BRIEF DESCRIPTION OF THE DRAWINGS

The appended drawings illustrate only exemplary embodiments of the invention and therefore do not limit its scope, because the inventive concepts lend themselves to other equally effective embodiments.

DETAILED DESCRIPTION

Figure 1:
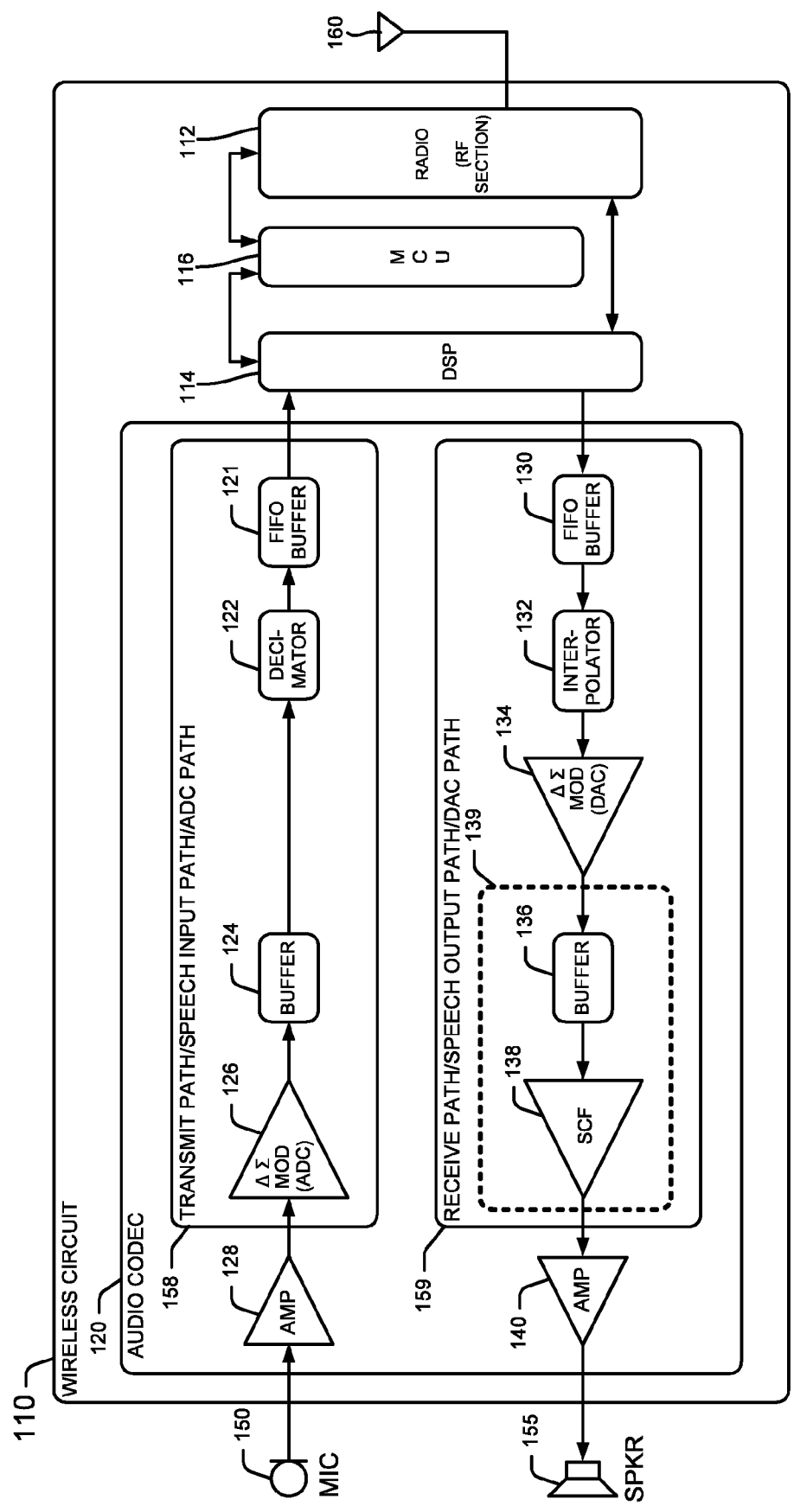
FIG. 1 shows a block diagram of a wireless communication device that may experience audio underflow under certain conditions when employing time domain isolation (TDI) to reduce undesired noise.

FIG. 1 shows a wireless communication device 100 that may experience audio underflow under certain conditions when employing time domain isolation (TDI) to reduce the effects of undesired digital noise. Device 100 includes a wireless circuit 110 in which some digital signal processing elements are turned off or disabled intermittently when circuit 110 performs radio operations. To help prevent a speech data output path (receive path) of wireless communication device 100 from running out of speech data and experiencing audio underflow, device 100 includes a pattern generator (not shown in FIG. 1) that assists in keeping the speech data output path filled with data.

Wireless communication device 100 includes a wireless circuit 110 that digitizes speech and transmits the resultant digitized speech data via radio frequency (RF) signals to a wireless network. Wireless circuit 110 also receives speech data via RF signals from the wireless network and produces an analog audio output signal in response thereto. Since the radio or RF section 112 of device 100 operates on very low magnitude RF signals, RF section 112 is very susceptible to noise such as that which a digital signal processor (DSP) 114 generates. Device 100 employs time domain isolation to effectively silence such noisy digital circuitry as DSP 114 during the intermittent time periods (RF time slots) in which RF section 112 is enabled to receive RF signals.

In general, when employing time domain isolation, RF section 112 operates during RF time slots when signal processing circuitry of wireless circuit 110 such as DSP 114 is inactive or disabled. Consequently, operation of noisy components such as DSP 114 does not interfere with the reception function of RF section 112. RF section 112 is generally enabled or turned on during RF time slots and turned off or disabled during signal processing time slots when digital noise is present. When employing time domain isolation, the noisy digital components are turned on or enabled during signal processing time slots and turned off or disabled during RF time slots. The terms "active", "enabled" and "turned on" as used herein are equivalent when referring to the state of the RF section 112 or signal processing circuitry such as DSP 114. The terms "inactive", "disabled" and "turned off" as used herein are equivalent when referring to the state of the RF section or signal processing circuitry such as DSP 114. Wireless communication system 100 includes a microcontroller unit (MCU) 116 that controls subsystems of system 100. MCU 116 is a digital component that is enabled and disabled in synchronism with the enabling and disabling of DSP 114 to reduce noise problems using time domain isolation techniques. MCU 116 typically operates at a sufficiently low frequency that it does not generate substantial digital noise that would interfere with RF reception activities.

The RF time slots typically occur when RF section 112 is active or enabled, and thus, wireless circuit 110 ensures that RF section 112 is not operating concurrently with noisy digital components that have the potential of causing noise-related problems with the operation of RF section 112. In some implementations of wireless device 100, device 100 communicates with a wireless network that uses the Global System for Mobile (GSM) standard that establishes frames, and time slots within the frames, for wireless circuit 110 to receive from, and transmit data to, the wireless network. Communication device 100 may employ other communication standards and protocols as well.

Wireless circuit 110 controls when the RF time slots and signal processing time slots occur. In one implementation, the RF time slots occur when the wireless circuit 100 transmits data to a base station, receives data from the base station, or monitors the power of adjacent cells in the wireless network. The RF time slots also occur when wireless circuit 110 performs neighboring cell monitoring functions, such as searching for control channels, extracting temporal and frequency information, or decoding control information from the serving base station or a neighboring cell. RF time slots may occur while RF section 112 is tuned to the appropriate frequency. A particular time slot may begin shortly before any of the above described operations and end when the operation is complete. Thus, it is possible that the RF and signal processing time slots may overlap. Additional information with respect to potential RF and signal processing time slot overlap and the operation of wireless circuit 110 with time domain isolation (TDI) is found in the copending U.S. Patent Application entitled "Highly Integrated Radio-Frequency Apparatus and Associated Methods", inventors Navdeep S. Sooch and G. Tyson Tuttle, Ser. No. 10/426,042 filed Apr. 29, 2003, the disclosure of which is incorporated herein by reference in its entirety.

Wireless circuit 110 includes an audio codec 120 as shown in FIG. 1. Audio codec 120 includes a transmit path or speech input path 158. Audio codec 120 also includes a receive path or speech output path 159. Speech input path 158 digitizes an analog audio signal that microphone 150 supplies. Speech input path 158 provides the resultant digitized speech data to DSP 114 for signal processing prior to transmission by RF section 112. Speech output path 159 receives digitized speech data from DSP 114 and provides a corresponding analog audio output signal that drives speaker 155.

More specifically, microphone 150 couples via an amplifier 128 of audio codec 120 to delta sigma modulator 126. Amplifier 128 provides an amplified audio signal to modulator 126 which acts as an analog to digital converter (ADC) in path 158. Modulator 126 provides the resultant digital signal to a first-in first-out (FIFO) buffer 121 via a decimator 122 and a buffer 124 therebetween, as shown. Decimator 122 couples to the output of buffer 124 to reduce the sampling rate of the data it receives from buffer 124. FIFO buffer 121 buffers the data it receives from decimator 122 for DSP 114. Path 158 may thus also be referred to as ADC path 158 because it converts the audio signal of microphone 150 into a digital speech signal.

Speech output path 159 acts as a digital to analog converter to convert received speech data from DSP 114 to a reconstructed analog audio signal to which speaker 155 provides output. More specifically, speech output path 159 includes a first-in first-out (FIFO) buffer 130 that receives digitized speech data from DSP 114. An interpolator 132 couples to the output of FIFO buffer 130 as shown. A delta sigma modulator 134 couples to interpolator 132 and acts as part of a digital to analog converter (DAC) for the interpolated speech data stream that it receives from interpolator 132. Path 159 may thus also be referred to as DAC path 159. A buffer 136 couples to modulator 134 to receive data from modulator 134. A switched capacitor filter (SCF) 138 couples to the output of buffer 136 to filter the speech signal that modulator 134 reconstructs. Buffer 136 and filter 138 together form a buffer/filter circuit 139 of audio codec 120. SCF 138 together with modulator 134 act as a signal reconstructor that builds a filtered output signal as a series of digital up or down steps that follow the waveform of the original data speech signal as indicated by the bit stream that interpolator 132 provides to modulator 134. As described in more detail below, when data is available in buffer 136, switched capacitor filter 138 of path 159 receives the data from buffer 136 and provides a corresponding analog output signal to amplifier 140 that drives loudspeaker 155.

DSP 114 is a noisy digital component of wireless circuit 110 that is effectively shut down or disabled by circuit 110 during the RF time slots when RF section 112 is active. One challenge that is associated with turning off DSP 114 during the RF time slots is maintaining continuity in the functions performed by DSP 114. For example, a voice band audio stream requires processing one data sample every 125 μs in one implementation. The duration of an RF time slot may exceed 5 ms or the equivalent of 40 audio data samples. Since DSP 114 is inactive during this interval, circuitry is provided to buffer the acoustic data in both the input (via path 158) and output (via path 159) directions.

Path 159 may include a substantial amount of storage to bridge the RF time slots when DSP 114 is inactive. For example, buffer 136 of path 159 may exhibit sufficient capacity to store 5.7 ms of audio data. In one implementation, buffer 136 is not turned off or inactivated during the RF time slots, but rather continues to operate whenever path 159 is active. FIFO buffer 130 provides additional buffering. FIFO buffer 130 may be implemented in circuitry that is shut down or inactivated during the RF time slots. When a telephone call is initiated, there may be a relatively long delay before any valid speech data is received from a phone call. For example, it may take approximately 37 ms to receive a valid speech block and another 10 to 12 ms to decode the speech block. There may also be a period of fast associated control channel (FACCH) burst transactions at the beginning of a call that further delays receipt of valid audio data.

In one implementation, particular circuitry (described below) of receive path 159 continues to function between the time that audio codec 120 is fully enabled (at the conclusion of an RF time slot) and the time that RF speech data is provided by DSP 114. In general, if the buffer 136 runs out of speech data, DSP 114 is interrupted at a certain rate (a rate of 8 kHz, for example) to take corrective action (such as writing "dummy data" if no speech data is currently available) to the path 159 to keep the path 159 primed with data. However, due to the above-described blackout periods that occur in connection with TDI, DSP 114 is not always available to maintain the integrity of the data that is processed by path 159. Codec 120 includes a quiet data source (described below with reference to FIG. 2) that is separate from DSP 114 and that is active and available during the RF time slots to keep path 159 primed with data sufficient to decrease the potential for audio underflow.

Figure 2:
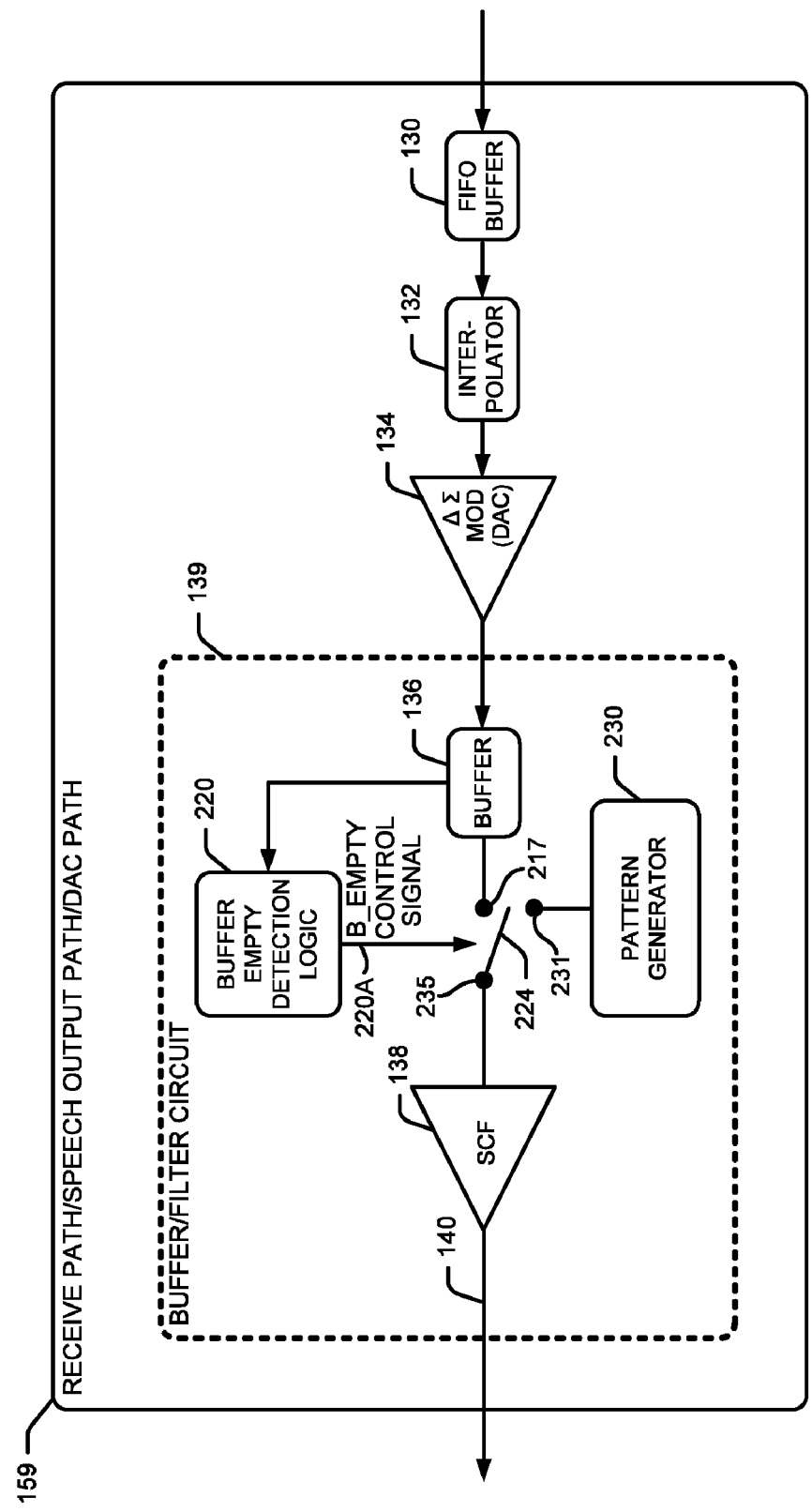
FIG. 2 shows a block diagram of buffer/filter section of an audio codec that employs a pattern generator to supplement the data stream through the buffer with pattern data when the buffer is empty.

FIG. 2 shows a buffer/filter circuit 139 of audio codec 120 that employs a pattern generator 230 to supplement the data stream from buffer 136 to SCF 138 with pattern data when buffer empty detection logic 220 determines that buffer 136 is empty. Buffer 136 receives speech data from modulator 134. Modulator 134 modulates its multibit oversampled input signal to provide a one bit oversampled digital output signal. For example, in one implementation, modulator 134 may sample a 13 bit data input stream to produce a corresponding oversampled one bit sign of change signal at its output terminal.

Modulator 134 acts together with buffer 136 and SCF 138 as a signal reconstructor that builds an analog audio output signal as a series of digital up or down steps that follow the waveform of the original speech data signal. In response to the bit stream that interpolator 132 provides to modulator 134, modulator 134 provides a 1 bit sign of change signal that either exhibits a +1 or −1 state. The +1 state indicates a signal increase in the reconstructed signal that SCF 138 generates while conversely a −1 state indicates a signal decrease in the reconstructed signal that SCF 138 generates. Buffer 136 stores the stream of +1 and −1 bits that modulator 134 produces in response to interpolator 132.

Buffer empty detection logic 220 couples to buffer 136 and determines when buffer 136 is empty. More particularly, buffer empty detection logic 220 generates a control signal at control output 220A that exhibits one logic state to indicate that buffer 136 contains data and another logic state to indicate that buffer 136 is empty. A switch 224 couples the input of switched capacitor filter (SCF) 138, namely terminal 235, to either the output of buffer 136 or the output of pattern generator 230. When data is present in buffer 136 of DAC path 159, namely when buffer 136 is not empty, logic 220 generates a control signal that instructs switch 224 to connect buffer 136 to SCF 138. In response, switch 224 couples terminal 217 to terminal 235, thus connecting the output of buffer 136 to the input of SCF 138. In contrast, when data is not present in buffer 136, namely when logic 220 determines that buffer 136 is empty, logic 220 generates a control signal that instructs switch 224 to couple pattern generator 230 to SCF 138. In response, switch 224 couples terminal 231 to terminal 235, thus connecting the output of pattern generator 230 to the input of SCF 138.

In other words, when data is present in buffer 136, the data in buffer 136 is communicated via output terminal 217 of buffer 136 to input terminal 235 of SCF 138. In response, SCF 138 integrates the sign of change signal that it receives from buffer 136. Thus, if SCF 138 receives a stream of successive +1 bits, the output signal of SCF 138 increases. Conversely, if SCF 138 receives a stream of successive −1 bits, then the output signal of SCF 138 decreases. In this manner, SCF 138 reconstructs the waveform of the original speech data signal as a series of very small increments up or down that taken as a whole regenerate the original waveform produced by transmit path 158 of another wireless communication device. Thus, SCF 138 functions as a digital to analog converter (DAC) that produces an analog audio output signal at SCF output 140. SCF 138 may also band limit the frequency of the analog audio output signal that it provides to SCF output 140.

In one implementation, SCF 138 operates in both the signal processing and RF time slots. Because DSP 114 does not provide data to DAC path 159 during RF time slots and DSP 114 experiences related blackout periods, buffer 136 may become empty; and thus, if not for the features of wireless circuit 110 that are described below, SCF 138 may not have an input signal. It is noted that during a speech call, buffer 136 is less likely to run out of data by employing SCF/buffer circuit 139 shown in FIG. 2. This addresses the problem in the scenario that occurs in connection with DSP 114 being turned off during an RF time slot and started back up when a new speech call is initiated. It is noted that if DAC buffer 136 provides a constant input signal to SCF 138 when buffer 136 is empty, SCF 138 may become saturated due to the integration of a constant value bit stream.

Naturally-occurring signals are not exactly constant. Rather, a naturally occurring "constant" signal may deviate slightly over a small range of values to cause modulator 134 to furnish a stream of −1 and +1 bits having a zero mean (i.e. the average value of the bit stream is zero) to be provided to SCF 138. It is the non-naturally occurring constant signal (such as a signal produced by a block of ones or zeros from buffer 136), however, that may saturate the SCF 138.

DAC path 159 includes circuitry to ensure that SCF 138 is not fed a constant value bit stream that might otherwise occur in time domain isolation (TDI). The input terminal 235 of SCF 138 is coupled to switch 224 (a metal oxide semiconductor (MOS)-based switch or a complementary MOS (CMOS)-based transmission gate) that is operated by DAC path 159 to selectively couple input terminal 235 to the output terminal 231 of pattern generator 230, a quiet data source, in response to logic 220 determining that buffer 136 has become empty. Thus, when connected to SCF 138, pattern generator 230 provides a varying stream of data to SCF 138 (in lieu of buffer 136 providing data) to ensure that SCF 138 does not become saturated either during or shortly after a particular time interval during an RF time slot.

More specifically, in some implementations of wireless circuit 110, buffer 136 is coupled to buffer empty detection logic 220 that monitors the state of buffer 136 to determine when buffer 136 is empty and in response to the logic 220 detecting that the buffer 136 is empty, logic 220 asserts a control signal (called "B_EMPTY") to cause a switch 224 to couple the input terminals 235 of SCF 138 to the output terminals 231 of pattern generator 230 to maintain a data flow to the SDF 138. Otherwise, if the buffer 136 is not empty, logic 220 de-asserts the B_EMPTY signal to cause switch 224 to couple the input terminals 235 of SCF 138 to the output terminals 217 of buffer 136.

The pattern generator 230 may (when coupled to SCF 138) provide a variety of different data streams to SCF 138, depending upon the particular implementation. For example, in some implementations, pattern generator 230 may produce a random stream of high and low digital values to the SCF 138. In other implementations, pattern generator 230 may provide a non-random data stream to the SCF 138, while in still other implementations pattern generator 230 may provide a pseudo-random signal. In each of these implementations, pattern generator 230 provides such a data stream so that SCF 138 will not run out of data when logic 220 detects that buffer 136 is empty.

To summarize the operation of buffer/filter circuit 139 of FIG. 2, buffer empty detection logic 220 performs a method that regulates the input data stream that is provided to SCF 138. Pursuant to this method, logic 220 determines whether buffer 136 exhibits a predetermined state, such as an empty state. If buffer 136 does exhibit the empty state, then logic 220 instructs switch 224 to couple SCF 138 to the pattern generator 230. Otherwise, if buffer 136 is not empty, then logic 220 instructs switch 224 to couple SCF 138 to buffer 136. More detail with respect to the above methodology that aims to prevent audio starvation or audio underflow in the receive path or DAC path 159 of a wireless communication device is found in the U.S. Patent Application entitled "Startup Apparatus And Technique For A Wireless System That Uses Time Domain Isolation" by inventors Anderton, et al., Pub. No. 2007/0001884 A1, Ser. No. 11/172,213, filed Jun. 29, 2005, which is incorporated herein by reference in its entirety.

In the event that the above described pattern generator methodology may not completely prevent audio underflow in some cases, another technique described below may be use instead of, or to supplement, the pattern generator methodology. Two types of audio underflow may occur in the system of FIG. 3, but for the methodology disclosed below, namely a first type of audio underflow wherein both TXBUF buffer 355 and TXFIFO buffer 335 are starved and a second type of audio underflow wherein TXBUF buffer 355 is starved. An irregular frame in the received signal may cause such an audio underflow condition. Another potential cause of audio underflow is when DSP 114 becomes so busy performing a task that the DSP is unable to feed data quickly enough to buffers 355 and/or buffer 335.

Figure 3:
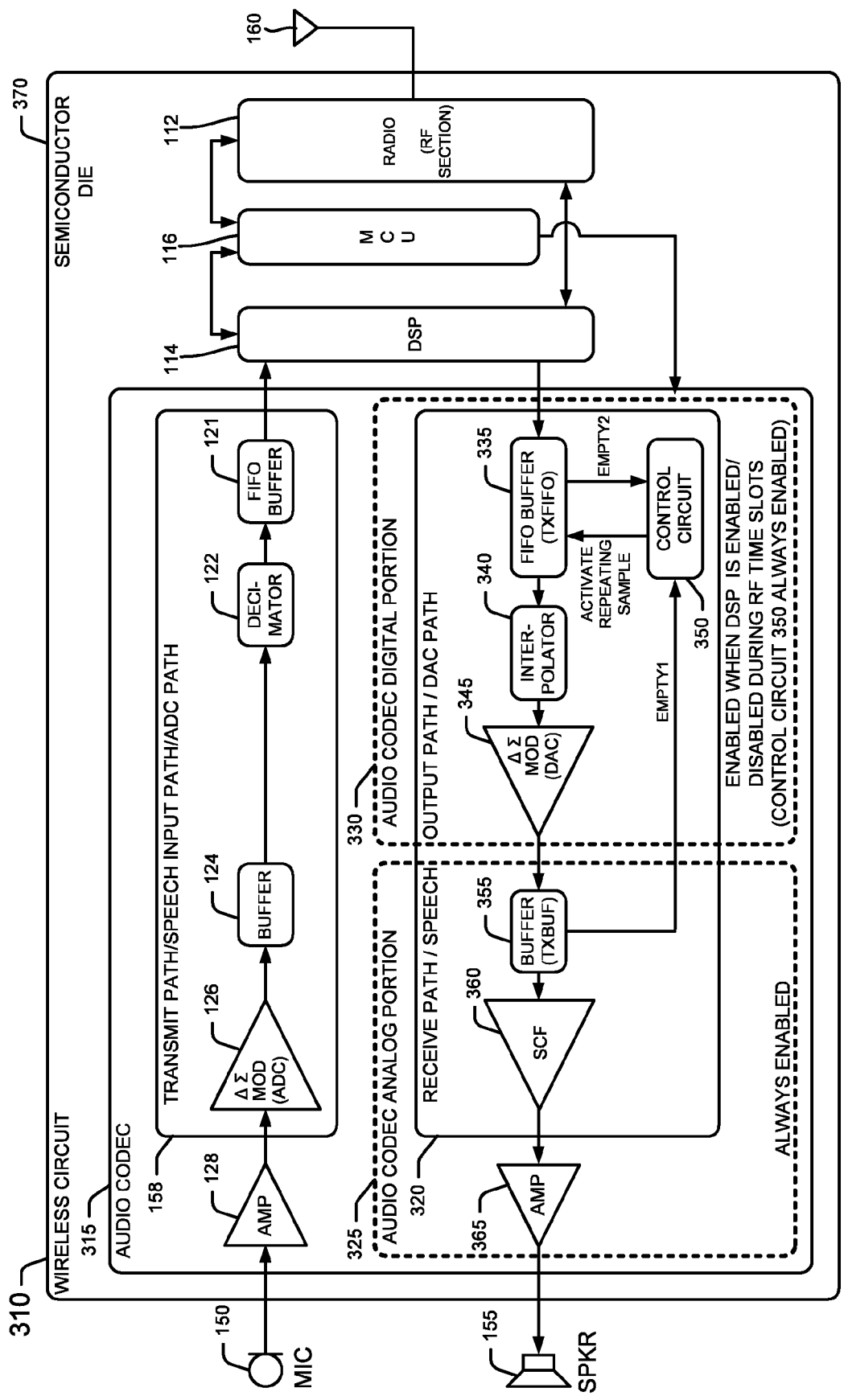
FIG. 3 shows a block diagram of one embodiment of the disclosed wireless communication device.

FIG. 3 shows a wireless communication device 300 that includes a number of elements in common with wireless communication device 100 of FIG. 3. Like numbers indicate like elements when comparing device 300 and device 100. Wireless communication device 300 includes a wireless circuit 310 having an audio codec 315 that employs transmit path or ADC path 158. Audio codec 315 also includes a receive path or DAC path 320. Audio codec 315 includes both an audio codec analog portion 325 that outputs a reconstructed analog audio speech signal and an audio codec digital portion 330 that performs digital functions described below.

Audio codec digital portion 330 includes part of the receive path or DAC path, namely FIFO buffer (TXFIFO) 335, interpolator 340, delta sigma modulator 345 and control circuit 350. Audio codec analog portion 325 includes buffer (TXBUF) 355, switched capacitor filter (SCF) 360 and audio amplifier 365. TXBUF buffer 355 provides an EMPTY1 signal to control circuit 350 that indicates when TXBUF buffer 355 is empty. TXFIFO buffer 335 provides an EMPTY2 signal to control circuit 350 that indicates when TXFIFO buffer 335 is empty. When control circuit 350 learns that one or both of these buffers are empty, control circuit 350 takes corrective action to assure that DAC path 320 does not experience audio underflow, as described in more detail below.

RF section 112 of wireless communication system 100 receives radio frequency (RF) signals that reach antenna 160 from a communication network. Microcontroller unit (MCU) 116 couples to RF section 112, DSP 114 and audio codec 315 to control the reception and transmission activities of these structures. In accordance with time domain isolation (TDI), MCU 116 deactivates DSP 114 and a portion of receive path/DAC path 320 during RF time slots. Conversely, MCU 116 activates DSP 114 and receive path/DAC path 320 during signal processing time slots in between the RF time slots. MCU 116 operates at a much lower frequency than DSP 114 and thus tends to produce significantly less noise than DSP 114.

Figure 4:
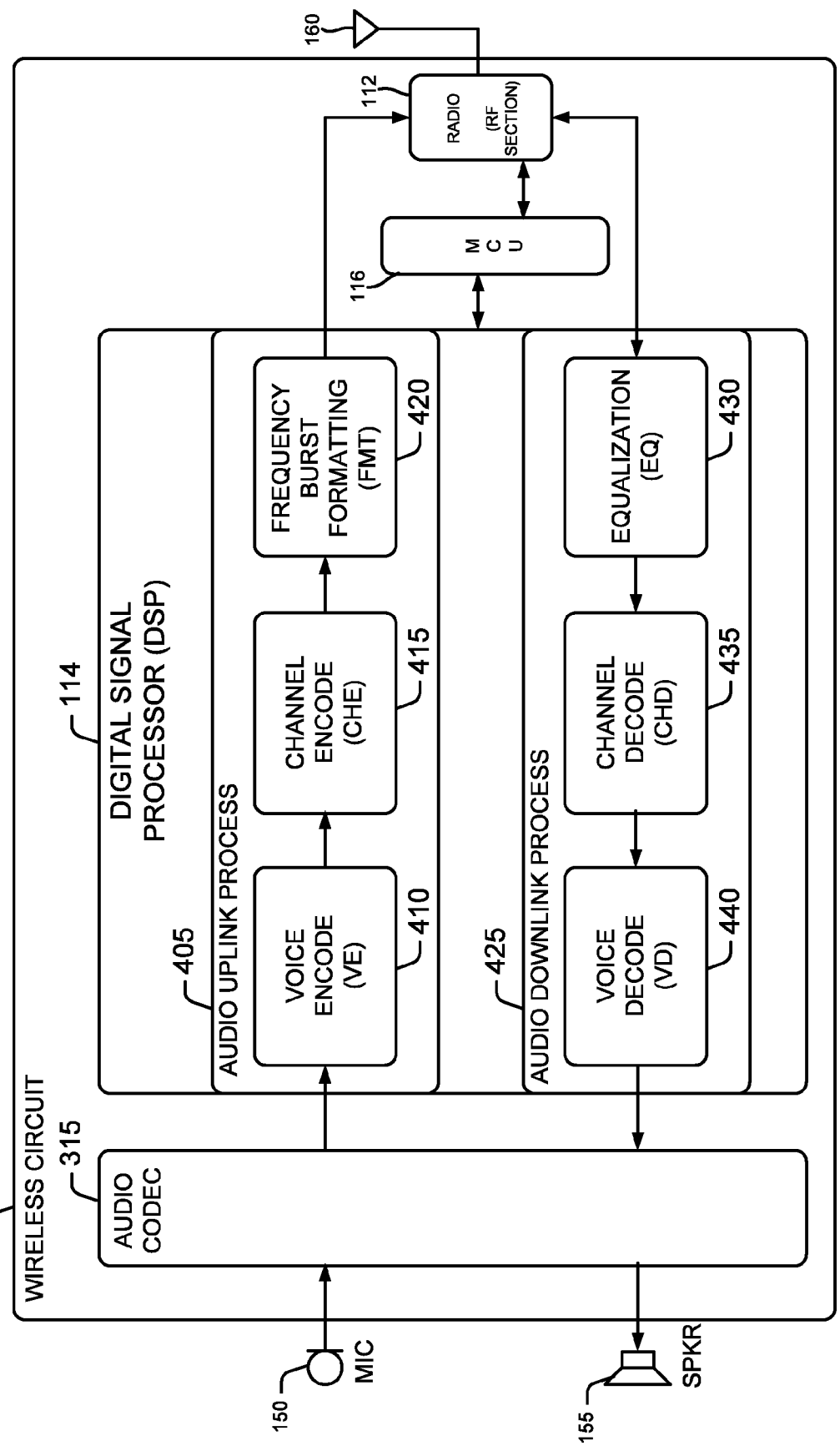
FIG. 4 shows a block diagram of a digital signal processor (DSP) and included DSP processes that the disclosed wireless communication device may employ.

FIG. 4 shows more detail with respect to the digital processes that DSP 114 conducts for a voice call, for example. DSP 114 performs an audio uplink process 405 that is associated with transmit path or ADC path 158 of FIG. 3. Audio uplink process 405 includes conventional voice encoding (VE) 410, channel encoding (CHE) 415 and frequency burst formatting (FMT) 420 processes. DSP 114 also performs an audio downlink process 425 that is associated with the receive path or DAC path 320 of FIG. 3. Audio downlink process 425 includes equalization (EQ) 430, channel decode (CHD) 435 and voice decode (440) processes, all as shown in FIG. 4. DSP 114 conducts these signal processing activities when RF section 112 is disabled, namely during the signal processing time slots between the RF time slots.

Returning to FIG. 3, audio codec 315 includes a receive path/DAC path 320 that converts digital speech data signals that it receives from DSP 114 into analog speech signals that are reproduced at loudspeaker 155. More specifically, TXFIFO buffer 335 receives digital speech data signals from DSP 114. Interpolator 340 interpolates or upsamples these digital speech data signals (for example, 16 bit words) to provide upsampled digital speech data signals to delta sigma modulator 345. Interpolator 340 provides an effective "speedup" of the digital speech data signals provided thereto to help receive path/DAC path 330 ride through those signal processing times when DSP 114 and a portion of DAC path 330 are disabled to allow radio reception. Modulator 345 performs an integration process in response to the upsampled speech data signal provided thereto, such that in cooperation with switched capacitor filter (SCF) 360, the original analog audio signal is reconstructed at the output of SCF 360. SCF 360 approximates the original analog audio signal as a series of small up or down steps patterned after the envelope of the original analog audio signal. SCF 360 effectively smoothes out these steps so that the analog audio signal at the output of SCF 360 more closely approximates the original analog audio signal. TXBUF buffer 355 couples between modulator 345 and SCF 360 to provide buffering to the digital signals passing therethrough. TXBUF buffer 355 and TXFIFO buffer 335 both provide buffering that helps reduce audio underflow in receive path/DAC path 320. Audio amplifier 365 couples between the output of SCF 360 and loudspeaker 155 to amplify the reconstructed analog audio signal at the output of SCF 360 to a level suitable for listening by the user. To summarize this waveform reconstruction process, modulator 345 converts multi-bit oversampled data to 1 bit oversampled data in this particular embodiment. Switched capacitor filter (SCF) 360 converts the 1 bit oversampled data to an analog discrete time signal. In actual practice, a continuous time filter (CTF, not shown) may be coupled to the output of SCF 360 to convert the analog discrete time signal into an analog continuous time signal that is amplified by audio amplifier 365. The continuous time filter (CTF) may be external to wireless circuit 310.

As noted in FIG. 3, in one embodiment, audio codec analog portion 325 is always enabled. In other words, audio codec analog portion 325 exhibits an enabled or activated state during both the RF time slots and the signal processing time slots between the RF time slots. However, audio codec digital portion 330 and DSP 114 exhibit a disabled or inactivated state during the RF time slots. In this manner, time domain isolation prevents digital noise from DSP 114 and audio codec digital portion 330 from interfering with RF reception activities by RF section 112 and audio codec analog portion 325 during the RF time slots. During the digital signal processing time slots between the RF time slots, audio codec digital portion 330 and DSP 114 exhibit an enabled or activated state while they conduct signal processing activities. Although TXBUF buffer 355 does receive a digital stream from audio codec digital portion 330, since the output of SCF 360 is an analog signal, audio codec analog portion 325 is considered to be primarily analog.

In a representative embodiment, DSP 114 sends digital speech data to TXFIFO buffer 335 of receive path or DAC 320 at a relatively low rate, for example 8K samples/sec or 40K samples/sec. Interpolator 340 oversamples the digital speech data from TXFIFO buffer 335 to remove images and forwards the resultant digital signal to digital delta sigma modulator 345. Delta sigma modulator 345 converts the multi-bit oversampled data (1 MHz rate) to a 1 bit oversampled data stream at a 1 MHz rate. Switched capacitor filter (SCF) 360 converts the 1 bit data stream that it receives via TXBUF buffer 355 to an analog discrete time signal. In accordance with this time domain isolation (TDI) embodiment, MCU 116 disables or inactivates modulator 345, interpolator 340 and DSP 114 during the RF time slots, namely during "radio on" time, while the analog SCF 360 processes 1 bit digital data at a 1 MHz rate continuously. Thus, TXBUF buffer 355 is used to store the 1 bit digital output stream from modulator 345 when the RF section 112 is disabled. TXBUF buffer 355 sends the data stored therein to SCF 360 continuously at a 1 MHz rate even when the RF section 112 is enabled or activated. Because MCU 116 disables or inactivates audio codec digital portion 330 (namely interpolator 340 and modulator 345), the 1 bit data must be stored in TXBUF buffer 355 at a much faster rate than 1 MHz when the radio is not in use, namely when RF section 112 is inactive or disabled. For this reason, interpolator 340 and modulator 345 process data from TXFIFO buffer 335 at a fast 13 MHz rate, in one embodiment. As discussed above, the interpolator 340 and modulator 345 are disabled during the RF time slots, namely during "radio on" times. TXFIFO buffer 335 is also disabled during the RF time slots.

The wireless communication device 100 shown in FIG. 1 may experience two types of audio underflow, namely a first type of audio underflow where both buffer 130 and buffer 136 are starved and a second type of audio underflow where buffer 136 is starved. The first type of audio underflow occurs during "radio off" times, namely during the digital signal processing times between the RF time slots. The second type of audio underflow occurs during the "radio on times", namely during the RF time slots when RF section 112 is enabled. When buffer 130 becomes starved, this can cause buffer 136 to become starved as well. But for the corrective action of control circuit 350 in wireless communication device 300 of FIG. 3, device 300 could also experience such audio starvation. In device 100 of FIG. 1, if buffer 136 experiences audio starvation, then the last value in buffer 136 continues driving SCF 138. If the last bit in buffer 136 is a 1, then buffer 136 keeps driving SCF 138 with a 1, 1, 1, 1 . . . and the analog output of SCF 138 produces a pop in loudspeaker 155 that is annoying to the user. This occurs because the SCF output integrates to full voltage if the last bit from buffer 136 is a 1. Similarly, if the last bit in buffer 136 is a 0, then buffer 136 keeps driving SCF 138 with a 0, 0, 0, 0 . . . and the user again experiences an undesirable pop sound from loudspeaker 155. In that case, the SCF output integrates to the ground rail voltage. When a new audio sample fills into buffer 136, a large pulse results and produces the audio pop sound. The first type of audio underflow as described above occurs during the signal processing time slots.

The second type of audio underflow occurs in the wireless device 100 of FIG. 1 when buffer 136 becomes empty while RF section 112 is on, namely during the RF time slots when DSP 114 is disabled or inactive. More particularly, the audio underflow problem occurs when system 100 begins an RF time slot or window and buffer 136 includes insufficient data to feed switched capacitor filter (SCF) 138 without becoming empty during that RF time slot or window. An undesired audio pop occurs in this situation as well.

As seen in FIG. 3, wireless device 300 includes control circuit 350 that instructs TXFIFO buffer 335 to repeat the last sample or value it receives from DSP 114 if one or both of TXFIFO buffer 335 and TXBUF buffer 355 becomes empty or exhibits less than a predetermined threshold value of their respective storage capacities. In this manner, if one or both of buffers 335 and 355 become empty or close to empty, the receive path or DAC path 320 does not experience audio starvation because FIFO buffer 355 continues to send data, namely the repeated last value, to interpolator 345. While this may cause a low amount of audio distortion for a short amount of time, it reduces or substantially eliminates an undesirable pop in the analog audio output signal that SCF 138 generates.

To prevent audio underflow in receive path/DAC path 320, the digital portion 330 of audio codec 315 includes control circuitry 350 that effectively re-enables interpolator when TXBUF buffer 355 and/or TXFIFO buffer 335 becomes empty. Control circuit 350 couples to TXBUF buffer 355 from which it receives an EMPTY1 signal that indicates when buffer 355 transitions from a non-empty state to an empty state. In one embodiment, buffer 355 exhibits an empty state or is substantially empty when it stores less data than a predetermined threshold amount of data. In other words, buffer 355 is nearly empty or substantially empty. Control circuit 350 also couples to TXFIFO buffer 335 from which it receives an EMPTY2 signal that indicates when buffer 335 transitions from a non-empty state to an empty state. In one embodiment, buffer 335 exhibits an empty state when it stores less data than a predetermined threshold amount of data such that buffer 335 is nearly empty or substantially empty. In one embodiment, buffers 335 and 355 are considered to be "substantially empty" when they are approximately 5% full" or less. Other percentages of fullness greater or less than this particular amount may be employed depending on the particular application. Stated alternatively, the predetermined threshold of buffer fullness may be zero or greater than zero, depending on the particular application." A buffer being substantially empty includes a buffer that is completely empty. In response to receiving signals EMPTY1 and EMPTY2 that indicate one of buffers 335 or 355 is empty, control circuit 350 sends an ACTIVATE REPEATING SAMPLE signal to buffer 335 that instructs buffer 335 to continue or repeat sending its last data to interpolator 340. In this manner, interpolator 340 continues to receive the last data it received from buffer 335 before buffer 335 became empty. Interpolator 340 continues to send that data via delta sigma converter 345 to TXBUF buffer 355. This causes the output signal of SCF 138 to remain at a substantially constant level instead of undesirably integrating to a rail voltage, as would otherwise occur without control circuit 350.

Figure 5:
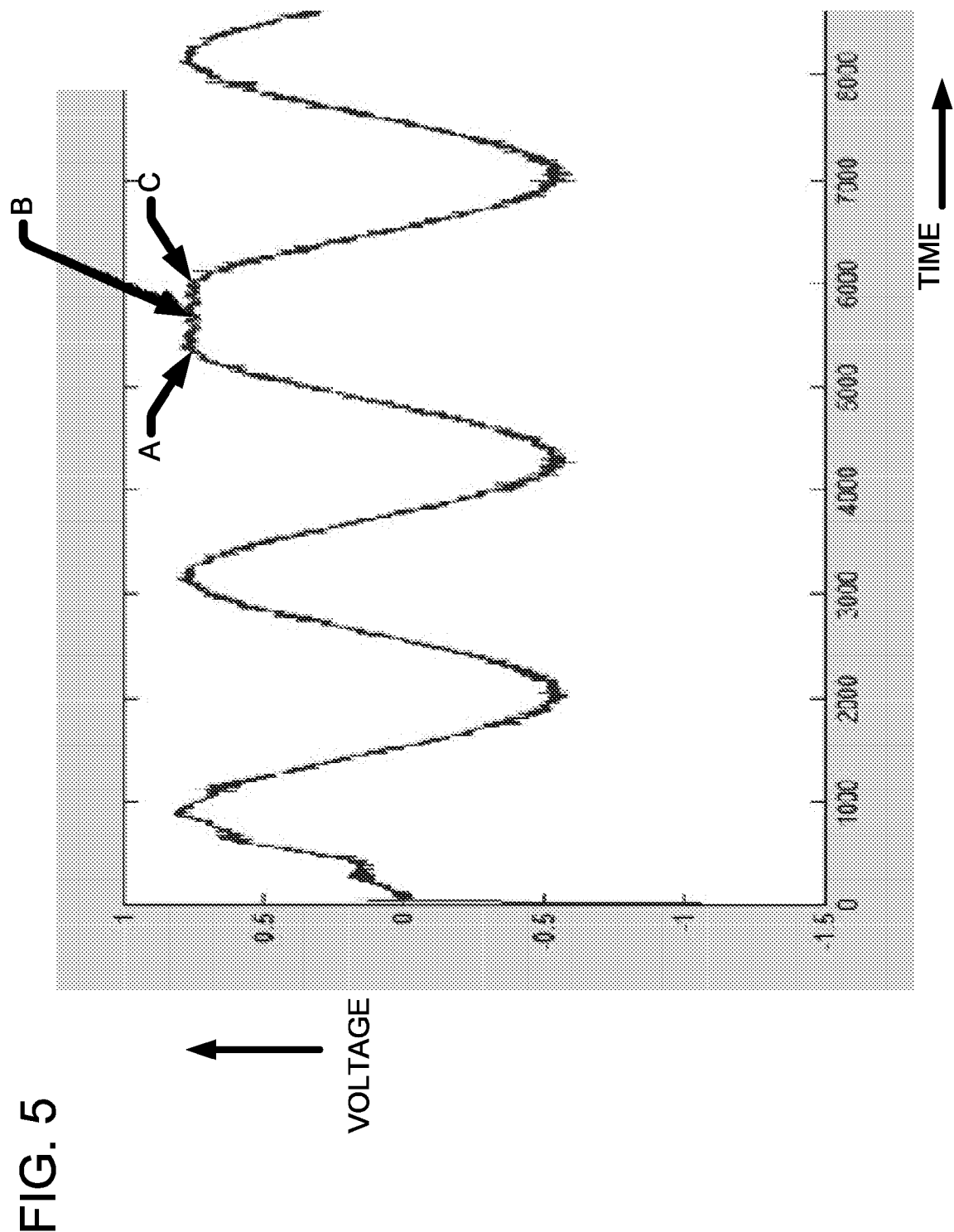
FIG. 5 shows a graphical representation of the reconstructed analog audio signal that appears at the filter output in one embodiment of the disclosed wireless communication device.

FIG. 5 is a representation of the reconstructed analog audio signal that appears at the output of switched capacitor filter (SCF) 360. Point A of FIG. 5 corresponds to the condition described above wherein one of buffers 335 and 355 becomes empty and wherein audio underflow would commence but for the action of control circuit 350. Signal region B in FIG. 5 indicates a portion of the reconstructed audio signal wherein buffer 335 repeats the last data it received, thus preventing audio underflow. Point C indicates a location on the reconstructed audio signal wherein samples again start flowing from DSP 114 to buffer 335. To summarize, if buffer 355 and/or buffer 335 becomes empty and stops sending data, then audio underflow could occur. If buffer 335 becomes empty, then downstream buffer 355 may shortly also become empty. Control circuit 350 assures that when buffer 335 becomes empty, or substantially empty, buffer 335 repeats transmission of the last data it received to interpolator 340. While a small amount of distortion may result in region B of FIG. 5, undesirable audio underflow is prevented.

Figure 6A:
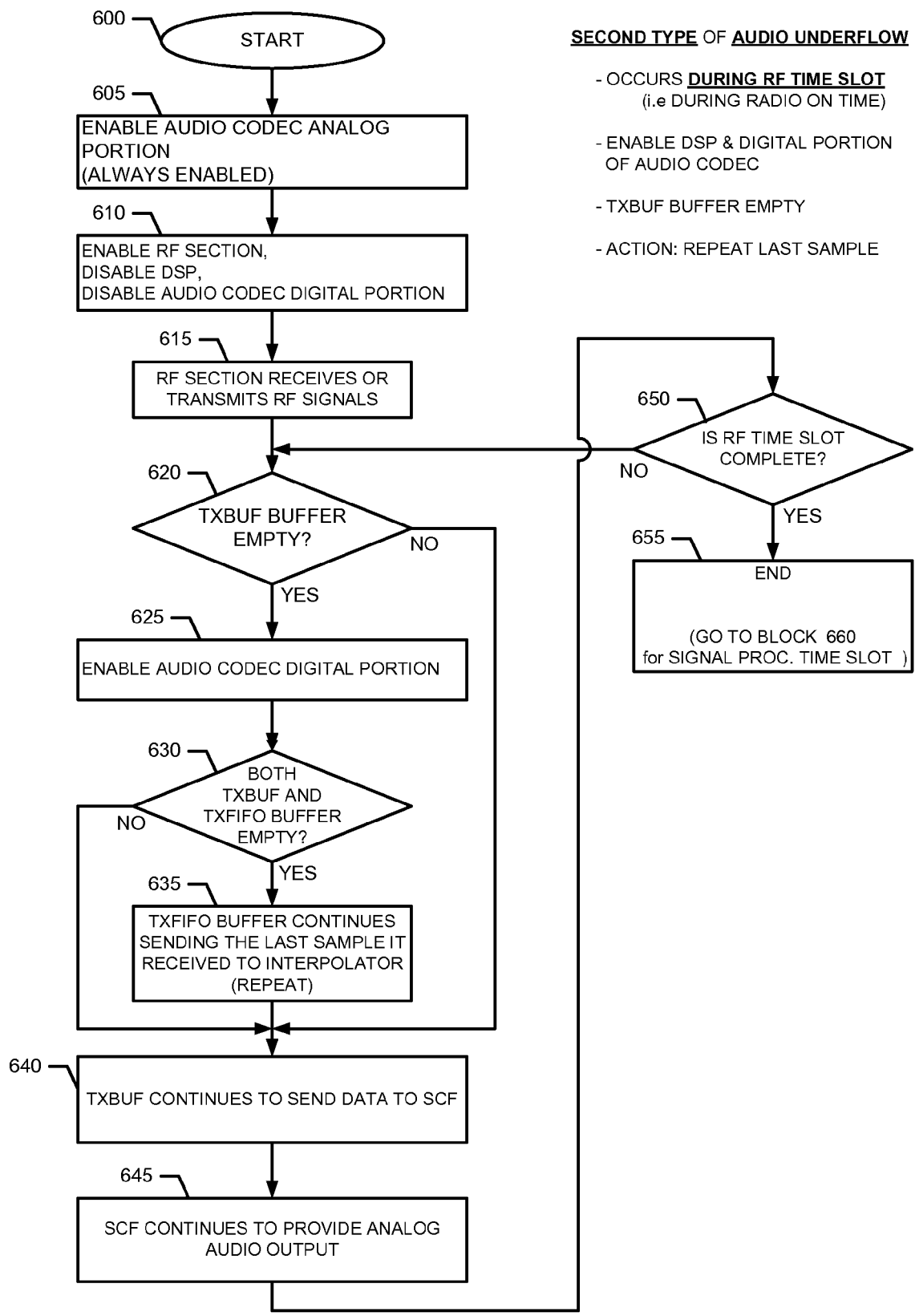
FIG. 6A is a flowchart that depicts the operation of one embodiment of the disclosed wireless communication device during RF time slots.
Figure 6B:
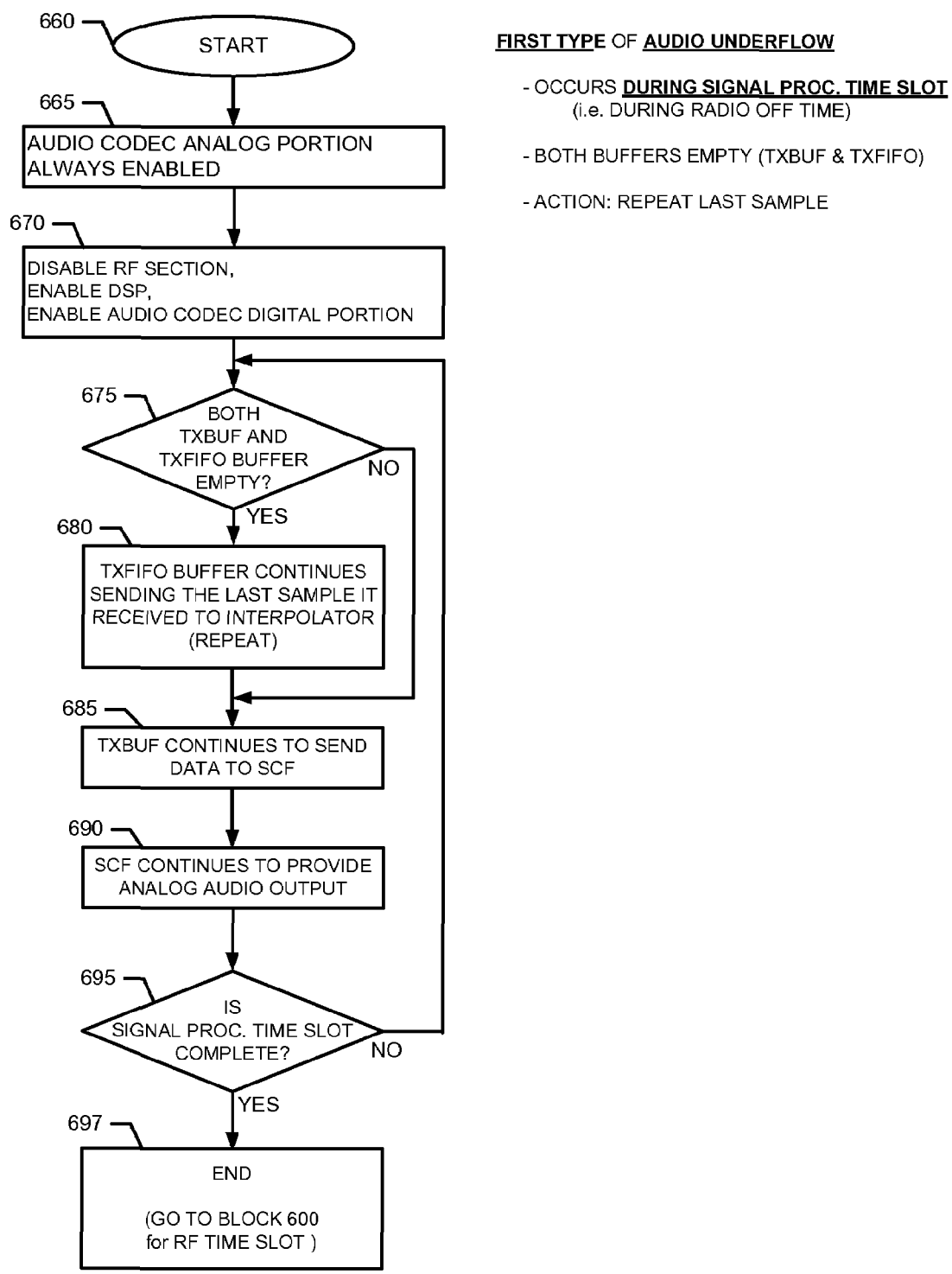
FIG. 6B is a flowchart that depicts the operation of one embodiment of the disclosed wireless communication device during signal processing time slots.

FIGS. 6A and 6B are flowcharts that depict one embodiment of the methodology that wireless communication device 300 employs to prevent audio underflow when operating in a time domain isolation environment. More specifically, FIG. 6B shows the operation of wireless communication device 300 to reduce the undesired effects of a first type of audio underflow, namely audio underflow that may occur during signal processing time slots. FIG. 6A shows the operation of wireless communication device 300 to reduce the undesired effects of a second type of audio underflow, namely audio underflow that may occur during RF time slots. The disclosed methodology employs time domain isolation such that when RF section 112 is enabled during RF time slots to receive incoming speech data radio frequency signals, DSP 114 and audio codec digital portion 330 are disabled to reduce noise during critical reception activities. Subsequently, DSP 114 and audio codec digital portion 330 are enabled during signal processing time slots to process incoming received signal samples. During receive time, namely during the RF time slots, MCU 116 enables RF section 112 and disables DSP 114/audio codec digital portion 330. During signal processing time, namely during the signal processing time slots, MCU 116 disables RF section 112 and enables DSP 114/audio codec digital portion 330. Receive time is followed by signal processing time, which is followed by receive time, which is followed by signal processing time, and so forth. Receive time refers to the RF time slots, while signal processing time refers to the signal processing time slots. Receive time is also designated as radio on time, while signal processing time is also designated as radio off time. While the above description refers to RF signal receiving activities during the RF time slots, wireless device 300 may also conduct RF transmitting activities during the RF time slots.

In the flowchart of FIG. 6A, process flow commences at start block 600 to reduce the second type of audio underflow that may otherwise occur during RF time slots. Audio codec analog portion 325 is enabled, as per block 605. In one embodiment, it is noted that in actual practice audio codec analog portion 605 is always enabled. Thus, TXBUF buffer 355 is always enabled and ready to receive information from audio codec digital portion 330. Likewise, switched capacitor filter (SCF) 360 is always enabled and available to convert information that it receives from audio codec digital portion 330 to an analog audio signal. Radio receive times (RF time slots) alternate with signal processing times (signal processing time slots) under time domain isolation. During radio receive times, MCU 116 enables RF section 112 and disables both DSP 114 and audio codec digital portion 330, as per block 610. RF section 112 then receives RF speech data signals and provides signal samples to DSP 114, as per block 615. RF section 112 provides baseband RF signals to DSP 116. Wireless device 300 may also transmit information at this time, namely during the RF timeslot.

Control circuit 350 conducts a test at decision block 620 to determine if TXBUF buffer 355 is empty or includes less than a predetermined very low amount of data. If TXBUF buffer 355 is substantially empty, then MCU 116 enables audio codec digital portion 330, as per block 625. Control circuit 350 then conducts a test at decision block 630 to determine if both TXBUF buffer 355 and TXFIFO buffer 335 are empty. If both TXBUF buffer 355 and TXFIFO buffer 335 are substantially empty, then to prevent audio starvation TXFIFO buffer 335 continues sending the last sample it received to interpolator 340, as per block 635. TXBUF buffer 355 in audio codec analog portion 320 sends its data to SCF 360, as per block 640. SCF 360 provides an analog audio output signal derived from the data it receives from the audio codec digital portion 330 via TXBUF buffer 355, as per block 645. Control circuit 350 conducts a test at decision block 650 to determine if the RF time slot is now complete. If the RF time slot is complete, then process flow ends for the second type of audio underflow process of FIG. 6A, as per block 655. Process flow then continues to block 660 of FIG. 6B which shows a process for handling the first type of audio underflow that may occur during signal processing time slots. However, if decision block 650 determines that the RF time slot is still not complete, then control circuit 350 continues checking to see if TXBUF buffer 355 is substantially empty, as per block 620.

Returning now to decision block 630 in the scenario wherein decision block 620 found that TXBUF buffer 355 is substantially empty, decision block 630 performs a determination to see if both TXBUF buffer 355 and TXFIFO buffer 335 are substantially empty. In the example above, decision block 630 found that both TXBUF buffer 355 and TXFIFO buffer 335 were substantially empty. This corresponded to an audio underflow condition and in response control circuit 350 took the corrective action of instructing TXFIFO buffer 335 to continue sending the last sample it received to interpolator 340, as per block 635. However, if control circuit 350 determines that both TXBUF buffer 355 and TXFIFO buffer 335 are not substantially empty, then control circuit 350 does not take corrective action and process flow continues to block 640. Returning to decision block 620, if control circuit 350 determines that TXBUF buffer 355 is not substantially empty, then device 300 is operating normally without audio underflow. In this event, process flow skips blocks 625, 630 and 635 which involve corrective action when both TXBUF buffer 355 and TXFIFO buffer 335 are substantially empty. Instead, process flow skips such corrective action and continues directly to block 640 wherein TXBUF buffer 355 continues sending data to SCF 360.

In the flowchart of FIG. 6B, process flow commences at start block 660 to reduce the second type of audio underflow that may otherwise occur during signal processing time slots. Audio codec analog portion 325 is enabled, as per block 665. In one embodiment, audio codec analog portion 325 is always enabled, namely during both the RF time slots and the signal processing time slots. MCU 116 disables RF section 112 and enables both the DSP 114 and audio codec digital portion 330 during signal processing time slots, as per block 670. Control circuit 350 conducts a test at decision block 675 to determine if both TXBUF buffer 355 and TXFIFO buffer 335 are substantially empty. If decision block 675 determines that both TXBUF buffer 355 and TXFIFO buffer 335 are substantially empty, then a potential audio underflow condition exists during the signal processing time slot. In response to this condition, control circuit 350 takes the corrective action of instructing TXFIFO buffer 335 to continue sending the last sample it received to interpolator 340, as per block 680. TXBUF buffer 355 continues to send data to SCF 360, as per block 685. SCF 360 continues to provide an analog audio output signal in response to the data it receives from TXBUF buffer 355, as per block 690. MCU 116 then performs a test to determine if the signal processing time slot is now complete, as per block 695. If the signal processing time slot is still not complete, then process flow continues back to decision block 675 at which control circuit 350 continues testing to determine if both TXBUF buffer 355 and TXFIFO buffer 335 are substantially empty. However, if the signal processing time slot is complete, then the first type of audio underflow process ends at block 697. The signal processing time slot is complete and the next RF time slot begins. Thus, process flow continues back to block 600 of the flowchart of FIG. 6A that handles the second type of audio underflow that may occur during RF time slots.

In one embodiment, wireless circuit 310 of FIG. 3 may be fabricated in a single semiconductor integrated circuit (IC). In other embodiments, wireless circuit 310 may include multiple IC packages that are coupled together. Wireless circuit 310 may be formed on a single semiconductor die 370 of a single semiconductor package, although in other embodiments wireless circuit 310 may include multiple dies in a single semiconductor package.

A wireless communication is thus disclosed that lessens the likelihood of audio underflow in a time domain isolation radio receiver environment.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. method of reducing audio underflow in a wireless communication device, the method comprising:
providing a first buffer that receives information from a processor of the wireless communication device, the processor being enabled for signal processing time slots and being disabled for RF time slots;
supplying, by the first buffer, received information to a filter that provides an analog audio output signal, the received information including audio data samples;
determining, by a control circuit, when the first buffer stores less than a predetermined amount of audio data samples that define the first buffer as being substantially empty, and
repeatedly sending to the filter, by the first buffer, a last audio data sample received by the first buffer, in response to a substantially empty first buffer determination such that audio underflow at the filter is reduced.

2. The method of claim 1, further comprising receiving, by an RF section of the wireless communication device, radio frequency signals during RF time periods when the RF section is enabled and the processor is disabled.

3. The method of claim 1, wherein the filter is a switched capacitor filter.

4. The method of claim 1, further comprising supplying, by the first buffer, audio data samples to a delta sigma modulator that supplies modulated audio data samples to a second buffer that supplies modulated audio data samples to the filter.

5. The method of claim 4, wherein the determining step includes the control circuit determining when both the first and second buffers are substantially empty and in response to such substantially empty buffer determinations, the first buffer repeatedly sends the last audio data sample to the filter via the second buffer.

6. The method of claim 4, wherein the control circuit instructs the first buffer to repeatedly send the last audio data sample to the filter via the second buffer.

7. The method of claim 4, further comprising interpolating the audio data samples of the first buffer to provide interpolated samples to the delta sigma modulator.

8. The method of claim 4, further comprising reducing a first type of audio underflow during signal processing time slots by repeatedly sending to the filter, by the first buffer, a last audio data sample received by the first buffer, in response to a substantially empty first buffer determination and a substantially empty second buffer determination.

9. The method of claim 4, further comprising reducing a second type of audio underflow during RF time slots by repeatedly sending to the filter, by the first buffer, a last audio data sample received by the first buffer, in response to a substantially empty first buffer determination and a substantially empty second buffer determination.

10. The method of claim 1, wherein the predetermined amount of audio data samples that define the first buffer as being substantially empty corresponds to the first buffer being approximately 5% full or less.

11. A wireless communication device comprising:
a radio frequency (RF) section that receives RF signals, thus providing received signals, the RF section being switchable to an enabled state during RF time slots and to a disabled state during signal processing time slots;
a processor, coupled to the RF section, that processes received signals from the RF section, the processor being switchable to an enabled state during signal processing time slots and to a disabled state during RF time slots, the processor providing processed audio data samples;
a digital to analog conversion (DAC) path, coupled to the processor, that converts processed audio data samples to an analog audio output signal, the DAC path including:
a first buffer that receives the processed audio data samples from the processor;
a filter, coupled to the first buffer, that receives processed audio data samples from the first buffer and that produces the analog audio output signal therefrom; and
a control circuit, coupled to the first buffer, that determines when the first buffer is storing less than a predetermined amount of processed audio data samples that define the first buffer as being substantially empty,
wherein in response to a substantially empty first buffer determination the control circuit instructs the first buffer to repeatedly send a last processed audio data sample received by the first buffer to the filter such that audio underflow at the filter is reduced.

12. The wireless communication device of claim 11, further comprising a microcontroller unit (MCU), coupled to the RF section and the processor, that enables the RF section and disables the processor during RF time slots.

13. The wireless communication device of claim 12, wherein the MCU disables the RF section and enables the processor during signal processing time slots.

14. The wireless communication device of claim 13, wherein the filter is a switched capacitor filter.

15. The wireless communication device of claim 11, further comprising
a delta sigma modulator situated in the DAC path and coupled between the first buffer and the filter; and
a second buffer coupled between the delta sigma modulator and the filter.

16. The wireless communication device of claim 15, wherein the control circuit is configured to determine when both the first and second buffers are substantially empty and in response to substantially empty buffer determinations, the first buffer repeatedly sends the last audio data sample to the filter via the second buffer.

17. The wireless communication device of claim 15, further comprising an interpolator coupled between the first buffer and the delta sigma modulator to upsample the processed audio signal samples of the first buffer.

18. The wireless communication device of claim 15, wherein the DAC path is configured to reduce a first type of audio underflow during signal processing time slots by repeatedly sending to the filter, by the first buffer, a last audio data sample received by the first buffer, in response to a substantially empty first buffer determination and a substantially empty second buffer determination.

19. The wireless communication device of claim 15, wherein the DAC path is configured to reduce a second type of audio underflow during RF time slots by repeatedly sending to the filter, by the first buffer, a last audio data sample received by the first buffer, in response to a substantially empty first buffer determination and a substantially empty second buffer determination.

20. The wireless communication device of claim 11, wherein the predetermined amount of audio data samples that define the first buffer as being substantially empty corresponds to the first buffer being approximately 5% full or less.

21. An integrated circuit, comprising:
a semiconductor die including
a radio frequency (RF) section that receives RF signals, thus providing received signals, the RF section being switchable to an enabled state during RF time slots and to a disabled state during signal processing time slots;
a processor, coupled to the RF section, that processes received signals from the RF section, the processor being switchable to an enabled state during signal processing time slots and to a disabled state during RF time slots, the processor providing processed audio data samples;
a digital to analog conversion (DAC) path, coupled to the processor, that converts processed audio data samples to an analog audio output signal, the DAC path including:
a first buffer that receives the processed audio data samples from the processor;
a filter, coupled to the first buffer, that receives processed audio data samples from the first buffer and that produces the analog audio output signal therefrom; and
a control circuit, coupled to the first buffer, that determines when the first buffer is storing less than a predetermined amount of processed audio data samples that define the first buffer as being substantially empty,
wherein in response to a substantially empty first buffer determination the control circuit instructs the first buffer to repeatedly send a last processed audio data sample received by the first buffer to the filter such that audio underflow at the filter is reduced.

22. The integrated circuit of claim 21, further comprising a microcontroller unit (MCU), coupled to the RF section and the processor, that enables the RF section and disables the processor during RF time slots.

23. The integrated circuit of claim 22, wherein the MCU disables the RF section and enables the processor during signal processing time slots.

24. The integrated circuit of claim 23, wherein the filter is a switched capacitor filter.

25. The integrated circuit of claim 21, further comprising
a delta sigma modulator situated in the DAC path and coupled between the first buffer and the filter; and
a second buffer coupled between the delta sigma modulator and the filter.

26. The integrated circuit of claim 25, wherein the control circuit is configured to determine when both the first and second buffers are substantially empty and in response to substantially empty buffer determinations, the first buffer repeatedly sends the last audio data sample to the filter via the second buffer.

27. The integrated circuit of claim 25, further comprising an interpolator coupled between the first buffer and the delta sigma modulator to upsample the processed audio signal samples of the first buffer.

28. The integrated circuit of claim 25, wherein the DAC path is configured to reduce a first type of audio underflow during signal processing time slots by repeatedly sending to the filter, by the first buffer, a last audio data sample received by the first buffer, in response to a substantially empty first buffer determination and a substantially empty second buffer determination.

29. The integrated circuit of claim 25, wherein the DAC path is configured to reduce a second type of audio underflow during RF time slots by repeatedly sending to the filter, by the first buffer, a last audio data sample received by the first buffer, in response to a substantially empty first buffer determination and a substantially empty second buffer determination.

30. The integrated circuit of claim 21, wherein the predetermined amount of audio data samples that define the first buffer as being substantially empty corresponds to the first buffer being approximately 5% full or less.

* * * * *